United States Patent [19]

Mason et al.

[11] Patent Number: 5,365,134
[45] Date of Patent: Nov. 15, 1994

[54] DC MAGNETIC MOTOR ASSEMBLY

[75] Inventors: Elmer B. Mason, 901 Vickie Dr., Del City, Okla. 73115; Robert E. Stark, Springdale, Ark.

[73] Assignee: Elmer B. Mason, Del City, Okla.

[21] Appl. No.: 180,258

[22] Filed: Jan. 12, 1994

Related U.S. Application Data

[63] Continuation-in-part of Ser. No. 4,153, Jan. 13, 1993, Pat. No. 5,283,492, and a continuation-in-part of Ser. No. 161,494, Dec. 6, 1993.

[51] Int. Cl.[5] .......................................... H02K 16/02
[52] U.S. Cl. ..................................................... 310/114
[58] Field of Search ......... 310/114, 112, 124, 40 MM, 310/40.5, 154

[56] References Cited
U.S. PATENT DOCUMENTS 5,212,418 5/1993 Mason .................................. 310/114
5,283,492 2/1994 Mason .................................. 310/114

*Primary Examiner*—Emanuel T. Voeltz
*Assistant Examiner*—E. To
*Attorney, Agent, or Firm*—Robert K. Rhea

[57] ABSTRACT

A direct current motor having an armature supported between magnetic pole plates having pairs of dual pole shoes extending between the plates in diametric opposition with respect to the periphery of the armature is energized by direct current through a pair of iron coil cores at opposite sides of the armature and connected with the magnetic pole plates. In other embodiments, the magnetic flux pattern facing the armature is longitudinally divided by a groove in the respective pole of the pairs of pole shoes facing the armature. Wiring and electrical current controls connect a DC source to the coils and armature for operating the armature and providing a selected torque with a minimum of ampere drain from the DC source.

15 Claims, 3 Drawing Sheets

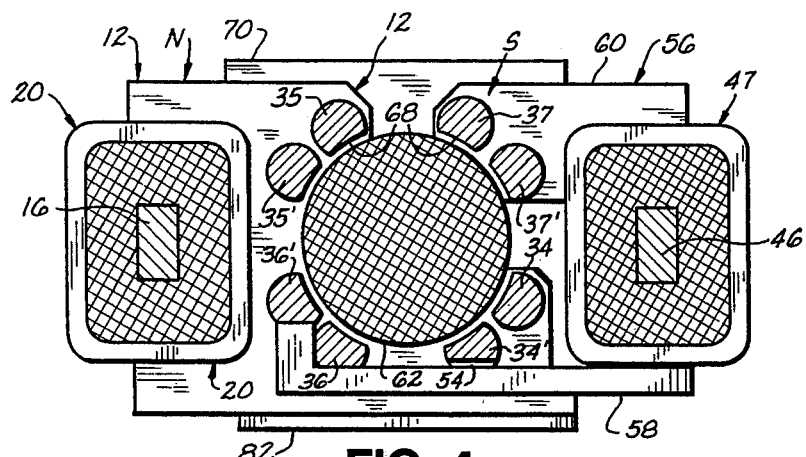
FIG. 4
FIG. 5
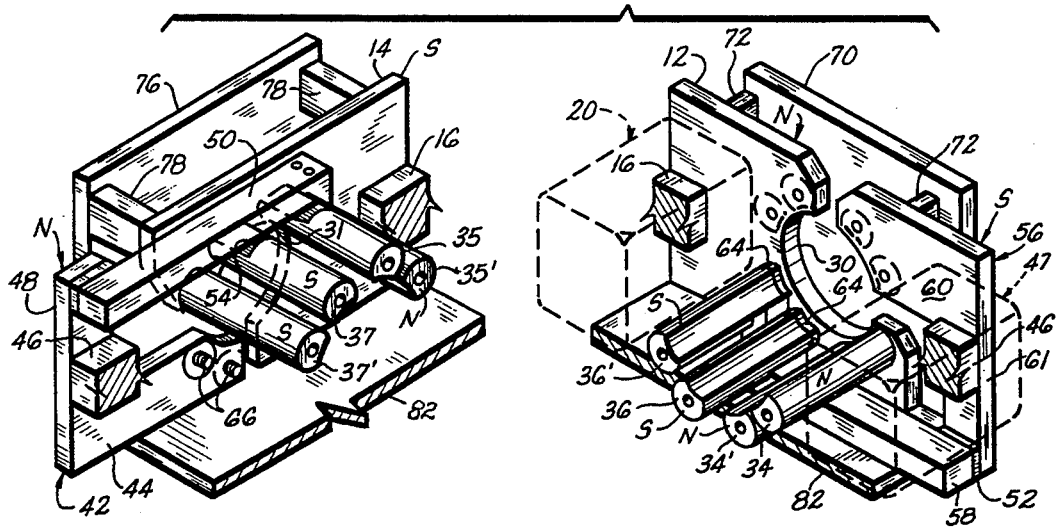
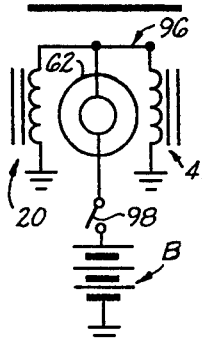
FIG. 11
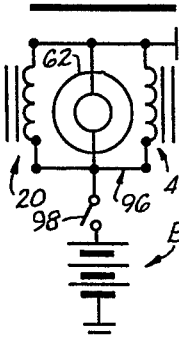
FIG. 12
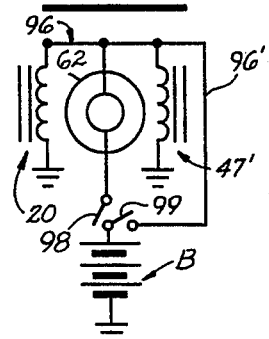
FIG. 13
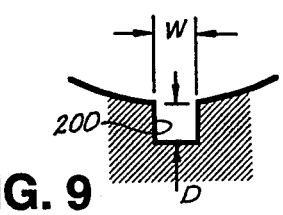
FIG. 9
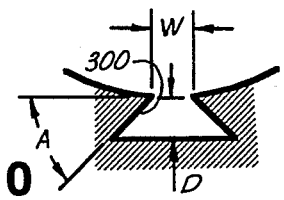
FIG. 10

DC MAGNETIC MOTOR ASSEMBLY

This application is a continuation-in-part of applications filed in the United States Patent and Trademark Office on Jan. 13, 1993 under Serial No. 08/004,153 for Multiple Magnetic Pole DC Motors U.S. Pat. No. 5,283,492, and Ser. No. 08/161,494 filed Dec. 6, 1993 for Magnetic Pole Stator DC Motor.

BACKGROUND OF THE INVENTION

This invention relates to direct current motors and more particularly to a motor having coils or magnets interposed between magnetizable members establishing a plurality of magnetic pole shoes for exciting an armature.

1. Field of the Invention

This application is distinctive over the first named copending application by disclosing a motor in which each pole piece of the respective pairs of pole pieces is physically divided to form dual pole shoes of each pair of pole shoes and is distinctive over both of the above copending applications by disclosing the division of the magnetic flux of the respective pole shoe in its longitudinal surface facing a peripheral portion of an armature.

Conventional direct current motors usually comprise a metallic housing journalling an armature with sectional field coils or stator windings contained by the housing which substantially surround the armature to provide a magnetic circuit for exciting the armature.

In this type of design one armature is operated by each group of stators or field windings resulting in inefficient utilization of the various circuits established, thus, limiting the potential of the magnetic circuit established by direct current through coils interposed between magnetizable pole pieces.

The relationship of magnetic material (iron) and magnetics is the most difficult problem to overcome in a DC motor, for the reason the metal forming the segments of the winding lobes of the rotor are naturally attracted by the magnetics of the field creating an unfavorable or counter electromotive force. The unfavorable force must be overcome as each segment of the rotor passes through the magnetic field. In order to overcome the unfavorable force, the motor must consume more energy or current.

Conventional technology can only use the major forces of magnetic attraction to cause a rotor to rotate within the magnetic field. The other remaining force, repulsion, cannot be utilized as a major force in a conventional DC motor.

The force of repulsion cannot advantageously be used because of its strategic location to the rotor.

This invention also changes the design of the correlation of the pole shoes relative to the armature. This invention allows the use of the repelling forces as well as the attracting forces to be utilized in the operation of a DC motor.

Normally generated magnetic current concentrates the strength of the polarity forces in the center of the magnetic pole core, e.g., a north pole of a magnet has the greatest strength at the center on the north pole. The same is true for the south pole. The flux patterns of normally generated magnetic current are eliptical. This invention changes the eliptical flux patterns to linear or straight. By this change in the flux patterns, the flux can be directed or concentrated to strategic locations on the armature.

Magnetic forces realigned within the field of the motor become absolute and operate at a consistently uniform pattern. Realignment of these forces capitalizes the maximum use or conversion of the energy into output torque and speed at the shaft of the motor.

This invention realigns these forces in a uniform plane by connecting carrier plates of soft iron to like poles of magnetic sources, either permanent or electromagnets, thereby allowing the forces to be utilized as a uniform pattern of magnetic flux regardless of their path as long as the air gap between the carrier plates is constant. This application of uniform magnetic flux allows several usable configurations, within the field, to be constructed to direct the flux to the rotor. With the addition of the uniform patterns of flux forces it is now possible to utilize the total effects of the two opposing forces, attraction and repulsion (force and counter force) of the same polarity, of both the field and the rotor, and eliminate the unfavorable force that would normally be present.

The creation of a uniform flux pattern within the field allows the use of additional areas of leverage to be applied to the rotor. To achieve these additional areas of leverage the carrier plate or pole shoe is divided. Two of the parts become dual pole shoes located precisely in relation to the winding of the rotor and a third part serves as a separation of the dual pole shoes. The separation or division of a single pole shoe operating in the same area of the armature field removes the potential of the unfavorable forces normally found in conventional DC motors. This application occurs at each of the opposing magnetically supplied field working forces. The addition of the points of leverage in a two pole motor will now become a four pole shoe two brush motor, and a four pole shoe four brush motor will become a four brush eight pole shoe motor. The addition of twice the leverage on the rotor by the field will increase the speed and the torque and only raise the current demand slightly.

2. Description of the Prior Art

The most pertinent patent is believed to be U.S. Pat. No. 5,212,418 issued to Mason on May 18, 1993 for HIGH TORQUE AND SPEED DC MOTORS.

This patent discloses some of the features of the motor of this invention, but does not disclose the diametrically opposite separate pairs of dual pole shoes having like polarity magnetic flux applied to respective ends of each pole shoe extending longitudinally of an armature for obtaining desired torque and speed or both of the armature and efficient use of input amperage as disclosed by this invention.

SUMMARY OF THE INVENTION

A direct current motor is formed by an armature interposed between opposing magnetizable members magnetized by permanent magnets or coils wound on cores extending between the members and energized by direct current from a source.

Elongated members normal to and connected with the respective magnetized member form opposing pairs of opposite polarity pole shoes disposed in diametric opposition on the armature.

Wiring and substantially conventional electrical controls connecting a direct current with the coils and armature are selectively operated resulting in a motor having selected speed, torque and low amperage input which is easily reversed by changing the direction of current through the commutator, a coil or the position of brushes on the commutator of the armature.

The principal object of this invention is to provide direct current motors and/or generators particularly useful in industry which are capable of higher speed, greater torque and greater efficiency and utilization of DC current potential when compared with conventional electric motors.

BRIEF DESCRIPTION OF THE DRAWINGS

FIG. 4 is a vertical cross sectional view taken substantially along the line 4—4 of FIG. 1;

FIG. 5 is an exploded perspective view of the motor pole plates and pole shoes;

DESCRIPTION OF THE PREFERRED EMBODIMENTS

Figure 1:
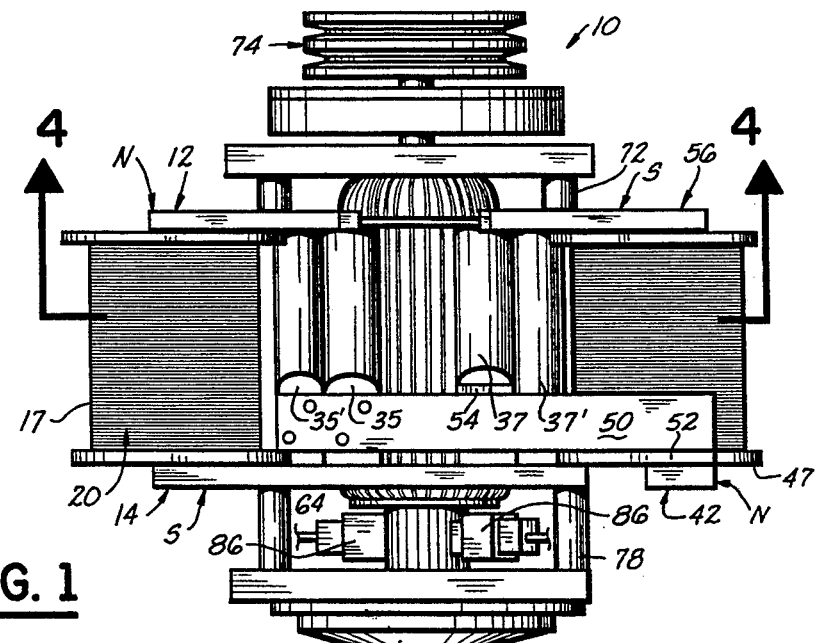
FIG. 1 is a top view of one embodiment of a DC motor with the motor housing top removed.
Figure 2:
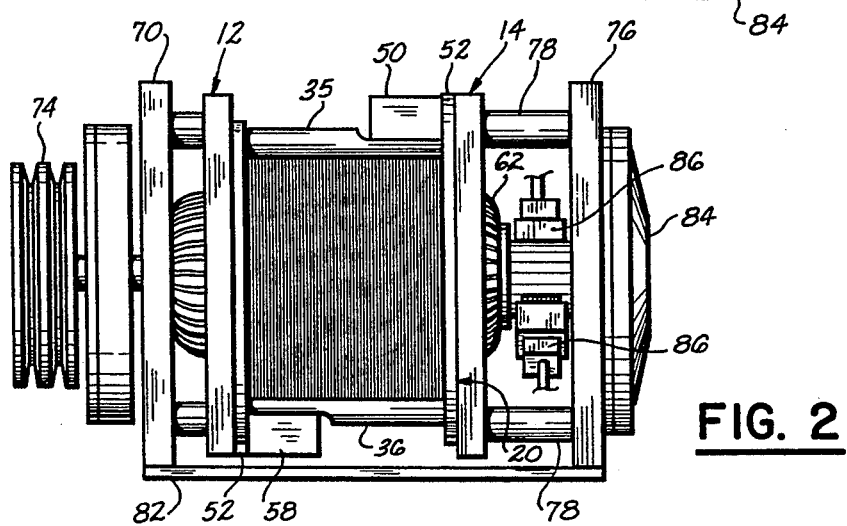
FIG. 2 is a left end elevational view.
Figure 3:
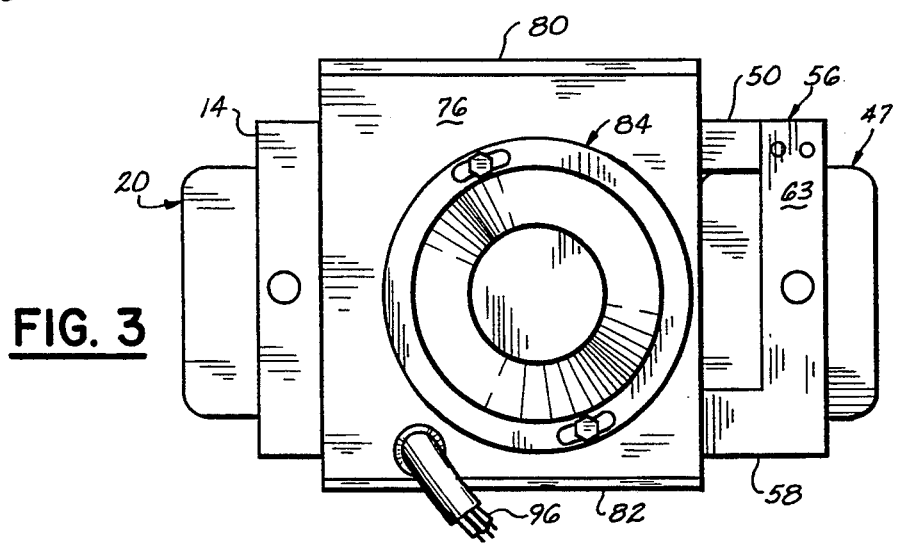
FIG. 3 is a front elevational view.
Figure 6:
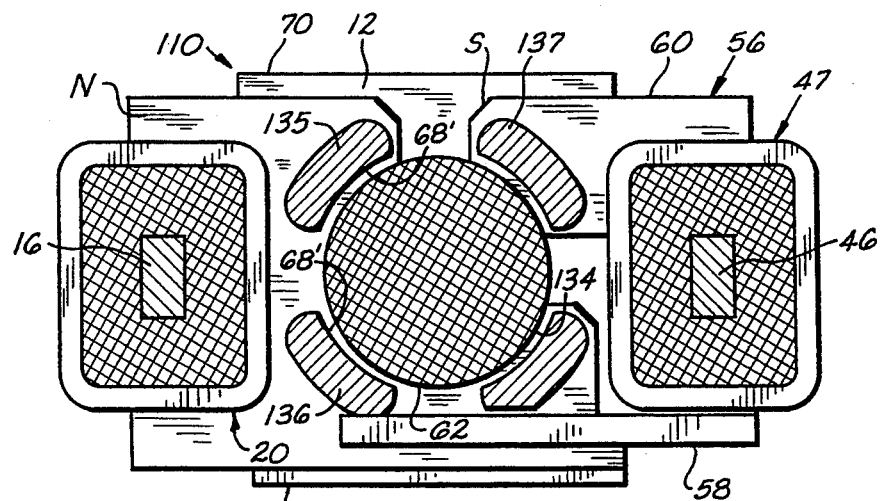
FIGS. 6, 7 and 8 are vertical cross sectional views similar to FIG. 4, respectively illustrating other embodiments of the pole shoes; and, FIGS. 9 and 10 are pole shoe groove dimension diagrams; and, FIGS. 11, 12 and 13 are wiring diagrams.
Figure 7:
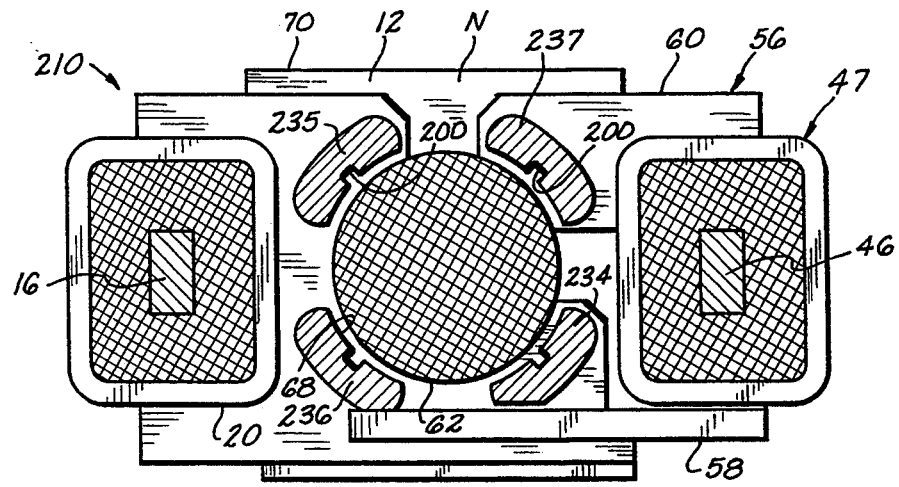

Like characters of reference designate like parts in those figures of the drawings in which they occur.

In the drawings:

Referring more particularly to FIGS. 1-5, the reference numeral 10 indicates one embodiment of a direct current electric motor assembly having a plurality of opposing magnetic pole plates and pole shoes in accordance with this invention.

The motor 10 includes a pair of parallel planar spaced-apart magnetizable pole plates 12 and 14 interconnected adjacent one end by a rectangular coil core 16 (FIGS. 4 and 5) of predetermined length.

A wire 17 is wrapped around the coil core 16 to form a coil 20, substantially rectangular, when viewed from either end of the coil (FIG. 4).

Obviously a plurality of wires, preferably an even number, of the same or different gauge may be simultaneously wound in-hand around the coil core for saturating pole plates and pole shoes with a selected flux density or polarity for armature speed control. This feature substantially eliminates the necessity of resistors in the control circuit.

When energized by electric DC potential, as presently explained, the coil 20 forms a north N and a south S magnetic pole of the respective plates 12 and 14. As best illustrated by FIG. 5, the north N pole plate 12 is rectangular in general configuration.

An aperture is formed in one end portion of the plate 12 and one corner portion of the plate 12 is removed leaving a circular arc 30 defining the remainder of the aperture of slightly greater than 180°.

One purpose of removing a corner portion of the plate 12 is to divide the magnetic flux and reduce heat generated therein and in an armature supported within the arc.

The other pole plate 14 is substantially identical in appearance and size, with respect to the pole plate 12, and is simply inverted from the position shown by the pole plate 12, before the two plates are joined by the core 16 of the coil 20. When joined by the coil core 16, the arcs 30-31 are axially aligned. Two pairs of dual rod members 34,34'-35,35' and 36,36'-37,37' of selected length and mass, e.g. one inch diameter (2.54 cm), form opposite polarity pole shoes extending between and connected at their respective ends to north N and south S pole plates in diametric opposition around the arcs 30-31, as presently explained.

To support the ends of the dual north N pole shoes 34-34', projecting toward the area opposite the arc 30, an L-shaped planar north N pole plate 42 (FIG. 5) lying in the plane of the south pole plate 14 has its foot portion 44 projecting toward the pole plate 14 in cooperative relation with respect to the arc 31 for connection with the adjacent end of the north N pole shoes 34,34'. A coil core 46 having a wire wrapped around it forming a coil 47, is connected with the leg portion 48 of the L-shaped pole plate 42 so that the L-shaped plate 42 forms a north pole N. The upper end portion of the leg 48 is connected in magnetic flux conducting relation with an elongated horizontal arm 50 parallel with the plane common to the pole plates 12 and 42, but magnetically spaced therefrom by a spacer 52 interposed between the arm 50 and leg 48. The upper surface of the end portion of the uppermost north N pole shoe 37 adjacent the pole plate 14 is cut-away, as at 54, so that the pole arm 50 may span the pole shoe 37 in vertically spaced relation and be connected with the north N pole shoes 35,35' at their end portions adjacent the south pole plate 14.

A companion L-shaped south S pole plate 56 and arm 58, formed identical with the L-shaped pole plate 42 and its arm 50 when longitudinally inverted in the direction of the longitudinal axis of the pole arm 50 is disposed at the other or right end portion of the pole plate 12 and secured to the coil core 46, as viewed in FIG. 5, so that its foot portion 60 is similarly disposed opposite the arc 30 for connection with the adjacent end of the south S dual pole shoes 37,37'. The other ends of the pole shoes 37,37' are connected with the south plate 14.

The coil core 46 connected with the leg 61 of the L-shaped pole plate 56 forms a south S pole of the plate. Similarly, the pole plate arm 58 is spaced from the leg 61 by a spacer 52 and projects parallel with the depending edge portion of the pole plate 12 similarly spanning in underlying relation the adjacent end portion of the north N pole shoes 34, 34' and is connected, at its end opposite the leg 61, with the adjacent end portions of the south S pole shoes 36,36'.

The surface defining the cut-off or removed area 54 of each pole shoe 34 and 37 is preferably coated with a layer of nonmagnetic flux conducting material, not shown, for reasons believed apparent.

Thus, it may be seen that the north N poles of the coils 20 and 47 are connected, respectively, with the north N plates 12 and 42 and that the pairs of transverse dual pole shoes 34,34' and 35,35' receiving like pole magnetic flux at each end form north N pole shoes in diametric opposition with respect to an armature 62 (FIGS. 1 and 2) disposed within the arcs 30-31, as presently explained. Similarly, the south S poles of the coils 20 and 47 are connected with the south S pole plates 14 and 56 and concentrate magnetic flux from the respective south S pole plates in both ends of the pairs of transverse dual south S pole shoes 36,36' and 37,37'.

Nonmagnetic spacers 64 and nonmagnetic screws 66 (FIG. 5) connect the ends of the north N pole shoes 34,34' and 35,35' to the south S pole plate 14 and similarly connect the ends of the south S poles shoes 36,36' and 37,37' to the north N pole plate 12 for rigidity.

The electric motor armature 62 extends between the respective north N and south S pole plates in axial alignment with the arcs 30-31 in the respective ends of the pole plates 12 and 14. As best illustrated by FIG. 4, the respective pole shoe of the diametrically opposite pairs of dual pole shoes 34-34', 35-35', 36-36' and 37-37' have a longitudinal peripheral portion of their surface milled out on a radius slightly greater than the radius of the armature 62 to define a transversely concave arc 68 on each pole shoe of the respective pairs of dual pole shoes having a transverse width less than one-half the winding span of the armature 62.

The preferred radial spacing between the periphery of the armature and the arcuate recesses 68 is 0.020", ±0.005" (0.051 cm ±0.103 cm).

A housing wall 70 apertured and provided with bearings, not shown, is positioned in parallel spaced relation with respect to the pole plate 12 and is connected thereto by a plurality of nonmagnetic spacers 72 for journalling the drive end of the armature shaft connected with pulleys 74.

Similarly, an opposite housing side wall 76 similarly cooperatively apertured and provided with bearings, not shown, journals the commutator end portion of the armature shaft and is connected with the south pole plate 14 by nonmagnetic spacers 78. Housing top and bottom walls 80 and 82 (FIG. 3) shield the armature and pole shoes.

An armature end plate 84 adjustably connected with the housing side wall 76 supports at least one pair of brushes 86 in contact with the commutator.

Obviously, the physical configuration of the motor 10 may assume other shapes such as is disclosed in the above named patent and copending applications.

A plurality of wires 96 (FIGS. 3 and 11-13) connect the potential of a battery B to the coils 20 and 47 and armature commutator in a substantially conventional manner through an on/off switch 98 and a circuit controller, not shown.

Referring also to the remaining Figures, the reference numeral 110 indicates another embodiment of the pole shoes in which opposing pairs of pole shoes 134-135 and 136-137 are similarly disposed in diametric opposition about the periphery of the armature 62. In this example, each pole shoe 134-137 has a thickness substantially equal to the diameter of the above described dual pole shoes and a width substantially equal to the combined transverse dimension of the respective dual pole shoes and spacing therebetween and are each provided with a transverse arcuate recess 68' excluding the armature winding span and similarly spaced from the periphery of the armature 62.

The reference numeral 210 indicates a further embodiment of the motor in which oppositely disposed pairs of pole shoes 234-235 and 236 and 237 similarly are disposed in diametric opposition about the periphery of the armature 62. Except as presently explained, a cross sectional configuration of each pole shoe 234-237 of these two pairs is substantially identical to the pole shoes 134-137 described for the embodiment 110. The pole shoes 234-237 are each provided with a longitudinally extending channel-like groove 200 medially the width of the concave recess 68'. The groove 200 is characterized by parallel side walls and an inward bottom surface normal to its walls. The width W of the recess (FIG. 9) is preferrably dimensioned to be equal with the transverse width of the respective lobe of the armature 62, e.g. 0.100". The depth D of the groove 200 is at least equal to or slightly greater than its width.

Figure 8:
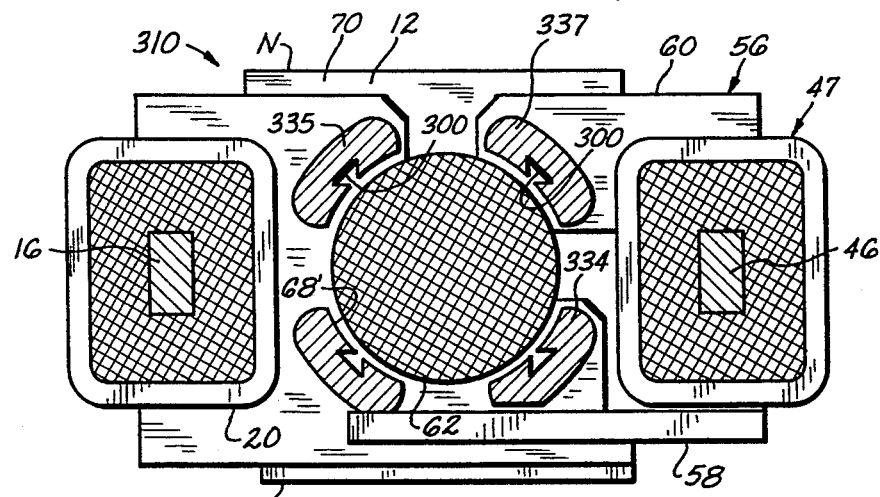

A further embodiment of the motor is indicated at 310 (FIG. 8) in which opposing pairs of the pole shoes, indicated at 334-335 and 336-337, are identical in external shape with respect to the pole shoes 234-237 and similarly disposed adjacent the periphery of the armature 62. In this embodiment, the pole shoes 334-337 are provided with a longitudinally extending central slot groove medially the width of its recess 68' having a width W and depth D as described hereinabove for the groove 200 but characterized by its walls diverging inwardly on an angle A, for example 45°.

The purpose of the grooves 200 and 300 is to longitudinally divide the magnetic flux in a pole shoe having the width of its armature facing concave recess 68' slightly less than the span of an armature, thus, forming juxtaposed magnetic flux shoes adjacent the periphery of an armature which enhances desired operating characteristics of the motors 210 and 310 as presently described.

It seems obvious that the several pole plates and pole shoes may be laminated, if desired.

Operation

The dual pole shoes of FIG. 4 results in an increase in RPM as opposed to single pole shoes of the same mass as each shoe of the dual pole shoes and an increase in torque with the added advantage that the separation of the shoes magnetic force, coacting with the magnetic force at the perimeter of the armature, utilizes magnetic repelling force between like poles in the armature and the shoes which cooperate with the magnetic attraction between one pole shoe of one polarity and an opposite polarity in the span of the armature. The opposing magnetic pole forces acts favorably in the angular rotation of the rotor, thus, substantially minimizing any counter electromotive force and increasing efficiency of the motor.

In the operation of the embodiment 110, the pole shoes 134-137 result in a slight decrease in armature RPM but an increase in the drive shaft torque with the efficiency substantially unchanged. A further increase in RPM and torque of the embodiments 10 or 110 may be obtained when the battery is connected to ground in series through the armature 62 and coils 20 and 47 by closing a switch 99 connecting the battery directly to the coils 20 and 47 through an armature bypass wire 96'.

In the embodiment 210 the channel-like groove 200 in the recesses 68' of each shoe of the pairs of pole shoes 234-237, armature RPM is increased over that disclosed for the embodiment 110 with a resulting increase in torque and motor efficiency.

The principal advantage of the dovetail-like groove 300 in each of the pole shoes 334-337 of the motor embodiment 310 is a resulting reduction in magnetic harmonics of the flux pattern is observed with the same increase of speed, torque and efficiency of the motor. In this embodiment, when additional voltage is added to the circuit as by connecting a second battery, not shown, to the circuit, the additional voltage results in an increase in armature RPM, drive shaft torque, motor efficiency and an increase in horse power by a factor of three.

Obviously the invention is susceptible to changes or alterations without defeating its practicability. Therefore, we do not wish to be confined to the preferred embodiments shown in the drawings and described herein.

We claim:

1. A DC motor assembly, comprising;

opposing spaced-apart magnetizable pole members;

magnetic flux field generating members extending between said pole members for polarizing each member of said pole members with a single polarity;

an armature having lobes forming a predetermined winding span operatively extending transversely between opposing members of said pole members;

opposing pairs of juxtaposed spaced-apart dual pole shoes extending between and connected for magnetic flux concentrating and conducting relation with like polarity pole members and in longitudinal interdigitated selected spaced relation about the periphery of said armature for forming a uniform concentrated magnetic flux field on the periphery of the armature normal to its longitudinal axis by opposite pairs of opposite polarity dual pole shoes adjacent and in diametric opposition with respect to the armature and the other pole shoes of the respective parts of dual pole shoes, each pole shoe of the respective pair of dual pole shoes having a concave recess facing the perimeter of the armature and formed on a radius complemental with the radius of the armature for forming a fine air gap between a peripheral portion of the armature and the surface defining the adjacent concave recess, the combined width of the respective recess in each pole shoe of the pairs of dual pole shoes and the space therebetween being less than the width of the winding span of the armature; housing and bearing means for supporting said armature between said pole members;

a source of DC potential; and, circuit means including switch and wiring means connecting the DC potential to ground through the armature for utilizing magnetic flux of like polarity from opposite directions in the respective pole shoe of said pairs of pole shoes and in diametric opposition on the armature, whereby the edge of the respective armature winding span in the direction of rotation is magnetically attracted by the recess of the adjacent pole shoe of the respective pair of dual pole shoes of the pairs of pole shoes and the spacing between the respective pair of dual pole shoes decreases the intensity of magnetic flux acting on the armature during switching change and precludes any counter electromotive force on the edge of the respective armature winding span opposite the direction of rotation which is magnetically repelled in the direction of armature rotation by the magnetic flux in the recess of the other pole shoe of the respective pairs of pole shoes.

2. The motor assembly according to claim 1 in which each shoe of the respective pair of shoes of said pairs of shoes comprises:

dual shoes disposed in juxtaposed spaced-apart relation with the spacing between adjacent edges of the concave recess in the respective pole shoe being less than the transverse width of the recess in either shoe.

3. The motor assembly according to claim 1 in which each shoe of the respective pair of shoes of said pairs of shoes comprises:

dual shoes each having the transverse width of its concave recess equal with one-third the winding span of the armature and disposed in juxtaposed spaced-apart relation with the spacing between adjacent edges of the concave recess in the respective pole shoe being no greater than the transverse width of the recess in either shoe.

4. The motor assembly according to claim 1 in which each shoe of the respective pair of shoes of said pairs of shoes is characterized by a longitudinally relatively narrow groove when compared with the width of its recess and medially the width of its recess for increasing the torque of the armature.

5. The motor assembly according to claim 4 in which the width of the groove is not less than the width of an armature winding span lobe.

6. The motor assembly according to claim 5 in which the depth of the groove is at least greater than its width.

7. The motor assembly according to claim 6 in which the groove is channel-like having a bottom surface normal to its parallel side walls.

8. The motor assembly according to claim 5 in which the groove is characterized by inwardly diverging side walls terminating at respective sides of a flat bottom.

9. The motor assembly according to claim 8 in which the said diverging side walls are respectively disposed at substantially 45° with respect to the bottom.

10. A DC motor assembly, comprising;

opposing spaced-apart magnetizable pole members;

magnetic flux field generating members extending between said pole members for polarizing each member of said pole members with a single polarity;

an armature having lobes forming a predetermined winding span operatively extending transversely between opposing members of said pole members;

opposing pairs of pole shoes extending between and connected for magnetic flux concentrating and conducting relation with like polarity pole members and in longitudinal interdigitated relation about the periphery of said armature for forming an armature field of uniform magnetic flux normal to the axes of the opposite pairs of opposite polarity pole shoes, each pole shoe of the respective pairs of pole shoes adjacent and in diametric opposition with respect to the armature and the other pole shoe of the respective pair of pole shoes, each pole shoe of the respective pair of pole shoes having a concave recess facing the perimeter of the armature and formed on a radius complemental with the radius of the armature for forming a fine air gap between a peripheral portion of the armature and the surface defining the adjacent concave recess, the width of the recess of each pole shoe of the pairs of pole shoes being less than the armature winding span width and having a magnetic flux relieving longitudinally extending groove medially its width, housing and bearing means for supporting said armature between said pole members;

a source of DC potential; and, circuit means including switch and wiring means connecting the DC potential to ground through the armature for utilizing magnetic flux of like polarity from opposite directions in the respective pole shoe of said pairs of pole shoes and in diametric opposition on the armature, whereby the edge of the respective armature winding span in the direction of rotation is magnetically attracted by the adjacent recess of the pole shoe of the respective pole shoe of the pairs of pole shoes and the space formed by the groove in the respective pole shoe decreases the intensity of magnetic flux acting on the armature during switching change and precludes any counter electromotive force on the edge of the respective armature winding span opposite the direction of rotation which is magnetically repelled in the direction of armature rotation by the magnetic flux in the other recess of the pole shoe of the respective pole shoe of the pairs of pole shoes.

11. The motor assembly according to claim 10 in which the width of the groove is not greater than the width of one lobe of the armature.

12. The motor assembly according to claim 11 in which the depth of the groove is at least greater than its width.

13. The motor assembly according to claim 12 in which the groove is channel-like having a bottom surface normal to its parallel side walls.

14. The motor assembly according to claim 13 in which the groove is characterized by inwardly diverging side walls terminating at respective sides of a flat bottom.

15. The motor assembly according to claim 14 in which the said diverging side walls are respectively disposed at substantially 45° with respect to the bottom.

* * * * *